Sept. 30, 1930.  H. M. SALISBURY ET AL  1,777,018
AIRPLANE
Filed Oct. 21, 1929
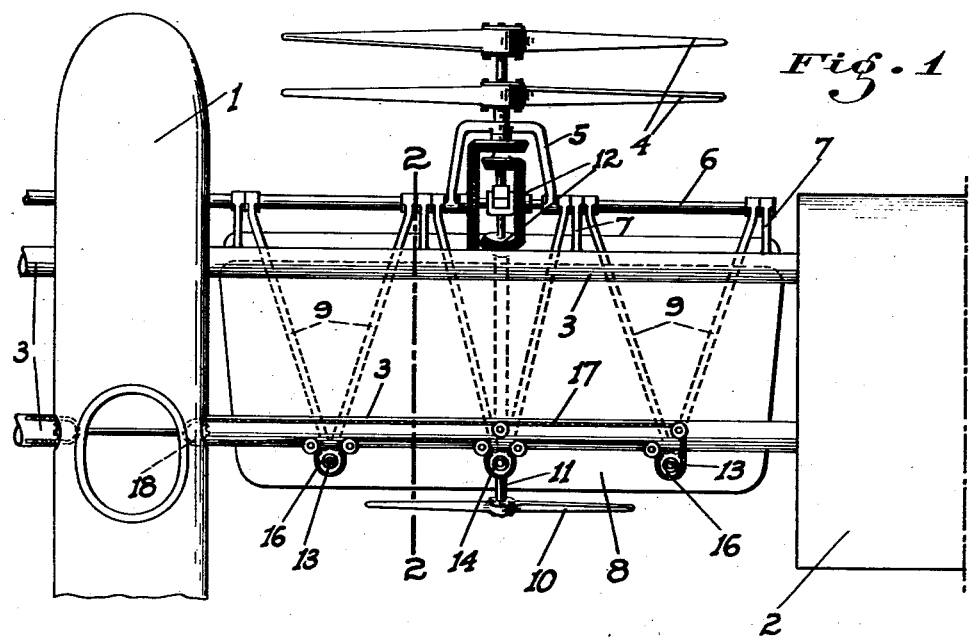
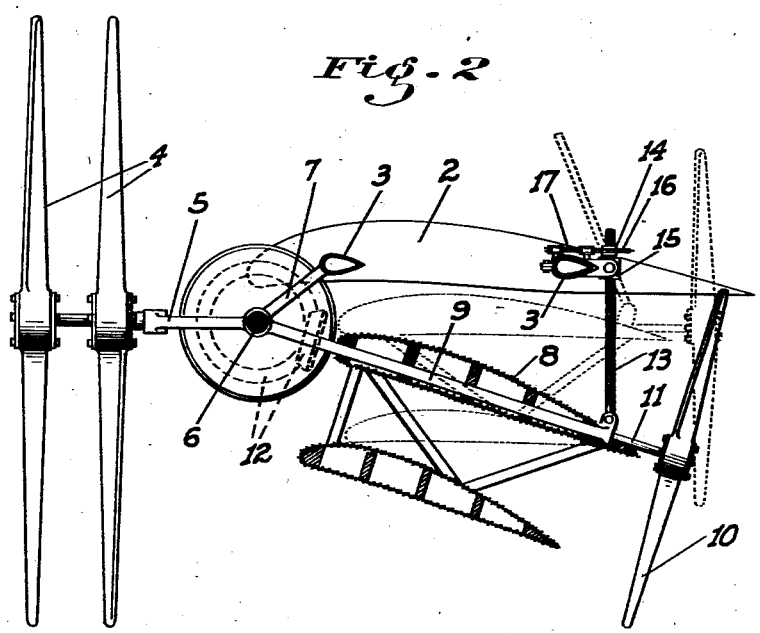
INVENTORS
Hervey M. Salisbury and
Arthur E. Miller
BY _____ ATTORNEY

UNITED STATES PATENT OFFICE

HERVEY M. SALISBURY, OF WALNUT GROVE, AND ARTHUR E. MILLER, OF SACRAMENTO, CALIFORNIA

AIRPLANE

Application filed October 21, 1929. Serial No. 401,083.

This invention relates to airplanes, and particularly to one of that type shown in our copending application for patent, Serial No. 392,558 filed September 14, 1929. The airplane in said application consists essentially of a fuselage, main wing surfaces spaced laterally from the fuselage, tractor propellers mounted in the spaces between the fuselage and wings and movable from horizontal to vertically disposed positions to lift the plane vertically and propel the same horizontally respectively; and additional pusher propellers, adjustable independently of the tractor propellers to aid in driving the airplane forwardly and in maintaining the same at a definite level when in flight.

The principal object of the present invention is to simplify and improve the construction of the previous device by providing auxiliary wing surfaces, mounted as a unit with the pusher propellers and adjustable therewith. The auxiliary wing surfaces may therefore be set at an angle to the main wings and not only provide additional support for the airplane as a whole but may be set to aid in the normal climbing of the plane and to enable the same to fly on an even keel and at a given height at a much slower speed than is possible with the ordinary form of airplane.

A further object of the invention is to produce a simple and inexpensive device and yet one which will be exceedingly effective for the purpose for which it is designed.

These objects we accomplish by means of such structure and relative arrangement of parts as will fully appear by a perusal of the following specification and claims.

In the drawings similar characters of reference indicate corresponding parts in the several views:

Fig. 1 is a fragmentary top plan view of the airplane showing one unit of the improved structure thereon.

Fig. 2 is a cross section on the line 2—2 of Fig. 1.

Referring now more particularly to the characters of reference on the drawings, the numeral 1 denotes the fuselage, to each side of and spaced considerably from which is a main wing element 2 connected to the fuselage by rigid transverse and longitudinally spaced supports 3.

Adjustable tractor propellers 4, mounted and driven in the same manner as in said copending application, are disposed ahead of the foremost support 3 in the space between the fuselage and the main wing. The shaft of these propellers is supported by a frame 5 fixed on torque tubes 6 projecting laterally from the fuselage parallel to said support 3, from which they are supported at intervals by bearing brackets 7. Disposed in the space between the fuselage and the main wing and under the supports 3 is an auxiliary wing or plane unit 8, which may be of the monoplane or biplane type as desired. The upper wing of this unit is rigidly supported from the torque tubes 6 by a plurality of rearwardly converging V-shaped trusses 9, suitably spaced along the wing and tubes and turnable on the latter. One or more pusher propellers 10 are disposed rearwardly of the auxiliary wing unit, the shaft 11 of this propeller projecting through the upper wing of the unit and being turnable about the torque tubes as an axis. This shaft is driven in connection with the tractor propellers by suitable means such as gearing, indicated at 12, or by a friction drive as desired, so as to permit the shaft being turned up or down about the tube as an axis without interfering with the driving of the propeller. The auxiliary wing and pusher propeller therefore form a single unit movable together and capable of adjustment about the torque tubes as an axis. Such adjustment is effected when desired by the pilot from his station in the fuselage at any time by the following means:

Projecting upwardly from the auxiliary wing adjacent its rear end and preferably flexibly secured to the corresponding ends of the supporting trusses are screws 13. Nuts 14 turnable on the screws are mounted against vertical movement in connection with swivel blocks 15 supported from the rearmost wing support 3. Sprocket wheels 16 are fixed with the nuts and are all engaged on the same side by one run of an endless chain 17 which extends into the fuselage and over a sprocket wheel 18 therein; said last named sprocket wheel being adapted to be rotated by the pilot in any suitable manner, as for instance that shown in the aforementioned copending application. The various screw nuts are thus all turned simultaneously so as to simultaneously raise or lower the screws and the corresponding end of the wing to the same amount; the extent of possible adjustment being such that the wing may be positioned either at a considerable upward and forward angle as shown, or so as to be parallel to the main wing, as indicated in dotted lines.

The pusher propeller of course moves correspondingly, maintaining the same relation to the auxiliary wing at all times. The same construction is disposed on the opposite side of the fuselage in the corresponding space, but being merely a duplicate of that described it is deemed unnecessary to show or describe the same.

From the foregoing description it will be readily seen that we have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described our invention, what we claim as new and useful and desire to secure by Letters Patent is:

1. An airplane including a fuselage, main supporting wings disposed to the sides of and spaced from the fuselage, auxiliary wings mounted in the spaces between the fuselage and wings, transversely spaced supports rigid with each wing and projecting ahead of the same, a member rigid with and projecting laterally from the fuselage and on which the forward ends of the supports are turnable, and means applied to the rear ends of the supports for raising and lowering the same.

2. An airplane including a fuselage, main supporting wings disposed to the sides of and spaced from the fuselage, auxiliary wings mounted in the spaces between the fuselage and wings, means for pivotally supporting the auxiliary wing adjacent one transversely extending edge in connection with the airplane, a plurality of screws projecting upwardly from the wing toward its opposite edge in transversely spaced relation to each other, nuts on said screws, means for mounting said nuts in fixed relationship to the airplane, and means for turning all said nuts simultaneously.

3. A structure as in claim 2, in which said last named means comprises sprocket wheels fixed with the nuts, an endless chain engaging all said wheels on the same side, and a hand controlled sprocket wheel in the fuselage also engaging the chain.

4. An airplane including a fuselage, main supporting wings fixed beyond the sides of and transversely spaced from the fuselage, and auxiliary wings mounted in and substantially the width of the spaces between the fuselage and wings and arranged for tilting movement longitudinally of the airplane.

5. An airplane including a fuselage, main supporting wings fixed beyond the sides of and transversely spaced from the fuselage, and auxiliary wings mounted in the spaces between the fuselage and wings and disposed in substantially horizontal planes adjacent the plane of the main wings; said auxiliary wings being adapted for tilting movement longitudinally of the airplane.

6. An airplane including a fuselage, main supporting wings fixed beyond the sides of and transversely spaced from the fuselage, auxiliary wings mounted in the spaces between the fuselage and wings and disposed in substantially horizontal planes adjacent the plane of the main wings; said auxiliary wings being adapted for tilting movement longitudinally of the airplane, and pusher propellers mounted as a unit with said auxiliary wings.

7. An airplane including a fuselage, main supporting wings fixed beyond the sides of and transversely spaced from the fuselage, longitudinally spaced and transversely extending supports projecting from the fuselage to and supporting the main wings, auxiliary wings disposed in the spaces between said main wings and the fuselage and under said supports, and supporting means for the front and rear edges of the auxiliary wings suspended from the main wing supports; one of said supporting means being vertically adjustable.

8. An airplane including a fuselage, main supporting wings fixed beyond the sides of and transversely spaced from the fuselage, longitudinally spaced and transversely extending supports projecting from the fuselage to and supporting the main wings, auxiliary wings disposed in the spaces between said main wings and the fuselage and under said supports, and of greater longitudinal extent than the distance between the supports; and supporting means for said auxiliary wings to enable the same to be tilted longitudinally of the airplane.

In testimony whereof we affix our signatures.

HERVEY M. SALISBURY.
ARTHUR E. MILLER.